Figure 1:
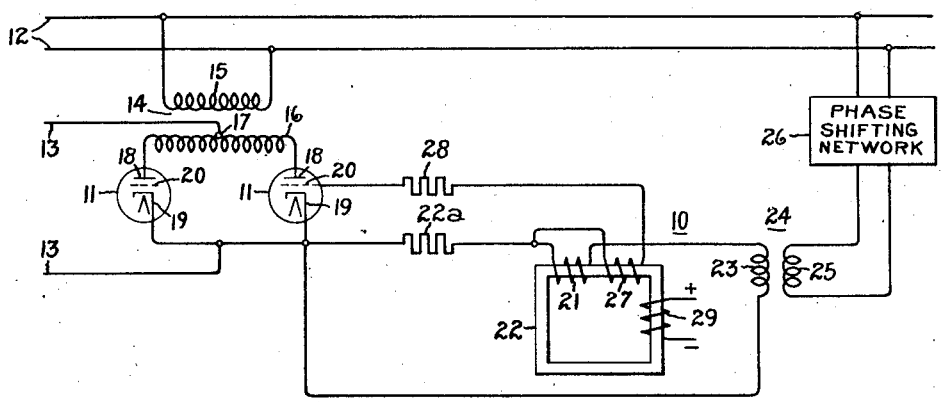

Oct. 7, 1947.  J. A. AUGIER  2,428,604
MEANS PRODUCING A STEEP WAVE FRONT POTENTIAL FOR
CONTROL OF ELECTRIC DISCHARGE DEVICES
Filed Dec. 31, 1942

Inventor:
Jean A. Augier,
by Harry E. Dunham
His Attorney.

Patented Oct. 7, 1947

2,428,604

UNITED STATES PATENT OFFICE 2,428,604

MEANS PRODUCING A STEEP WAVE FRONT POTENTIAL FOR CONTROL OF ELECTRIC DISCHARGE DEVICES

Jean A. Augier, Belfort, France, assignor to General Electric Company, a corporation of New York Application December 31, 1942, Serial No. 471,809
In France August 4, 1941

5 Claims. (Cl. 250—27)

My invention relates to electric control circuits and more particularly to an improved control circuit for producing a periodic voltage particularly adapted for energizing the control member of an electric discharge valve.

In one form of control circuit for producing a periodic voltage of steep wave front which has been used for energizing a control member of an electric valve, the voltage is derived from an impedance element, such as a risistor, connected in series with a self-saturating reactor and energized from an alternating-current supply voltage. In circuits of this type, it has been customary to utilize a separate source of hold-off or negative voltage which combines with the voltage of the impedance element to insure that the electric valve will be maintained nonconductive during the desired intervals. The use of such a voltage has some disadvantages from the standpoint of control as well as the expense incident to the additional source of voltage. In accordance with the teachings of my invention, I provide an improved control circuit in which a negative component of voltage derived from the saturable inductive device is impressed on the control member, thereby avoiding the necessity of providing a separate source of negative voltage and, at the same time, producing a more desirable resultant voltage on the control member.

It is an object of my invention to provide a new and improved electric control circuit.

It is another object of my invention to provide a new and improved circuit for energizing the control member of an electric discharge valve.

It is a still further object of my invention to provide a new and improved control circuit for producing a periodic voltage of steep wave front and which is decidedly negative in the region just preceding the steep wave front.

In the drawing, I have shown my invention embodied in a circuit for energizing the control member of a gas-filled electric discharge valve. The control member is energized by the sum of two components of voltage, one of which appears across the terminals of a resistor which is connected in series with an inductive winding and energized from an alternating-current supply circuit. The inductive winding is arranged on a core designed to saturate at a predetermined time in the cycle of voltage of the alternating-current supply circuit. A second winding on the same core with the first inductive winding supplies the second component of voltage. This winding is connected in circuit with the resistor and the control member of the electric valve. This second component of voltage produces a substantial negative voltage component in the region just preceding the instant at which the electric valve is rendered conductive.

My invention will be better understood by reference to the following description taken in connection with the accompanying drawing and its scope will be pointed out in the appended claims. In the drawing, Fig. 1 is a schematic representation of one embodiment of my invention, Figs. 2a and 2b represent certain electrical characteristics of the illustrated embodiment of my invention.

Referring now to the drawing, I have shown my invention embodied in a control circuit illustrated generally by the numeral 10 for controlling the conductivity of one of a pair of electric valves 11 which, as illustrated, form a part of a full-wave converter interconnecting a single-phase alternating-current circuit 12 and a direct-current circuit 13. It will be understood that a similar circuit would be provided for the other valve 11. The converter comprises a transformer 14 having a winding 15 connected with the alternating-current circuit 12 and a winding 16 having a midtap 17 connected with one of the direct-current lines 13 and the end terminals thereof connected with the other direct-current line 13 through the anode-cathode circuits of electric valves 11. Electric valves 11 may be of any of the well-known types and are preferably of the type employing an ionizable medium, such as a gas or a vapor, and each comprises an anode 18, a cathode 19, and a control member or grid 20.

The control circuit 10 embodying the novel features of my invention comprises an inductive winding 21 associated with a core 22 which is preferably of a high-permeability material which saturates rather abruptly at a predetermined value of flux density. The winding 21 is connected in series with an impedance element, such as a resistor 22a, and across the secondary winding 23 of a transformer 24 having the primary winding 25 thereof energized from the alternating-current circuit 12 through a suitable phase-shifting network illustrated diagrammatically at 26. The resistor 22a and a second winding 27 on the inductive device are connected in series between the cathode and control member of the electric valve 11 through a suitable current-limiting resistor 28 so that the voltage impressed on the control member at any instant is the sum of the instantaneous voltages of the resistor 22a and the winding 27. A winding 29, wound on the same core with windings 21 and 27, may be energized from any suitable source of direct-current voltage, not shown, and provides means for shifting the instant in the voltage wave of the transformer winding 23 at which the core 22 saturates and, in this way, determines the instant at which the electric valve 11 is rendered conductive.

Figure 2A:
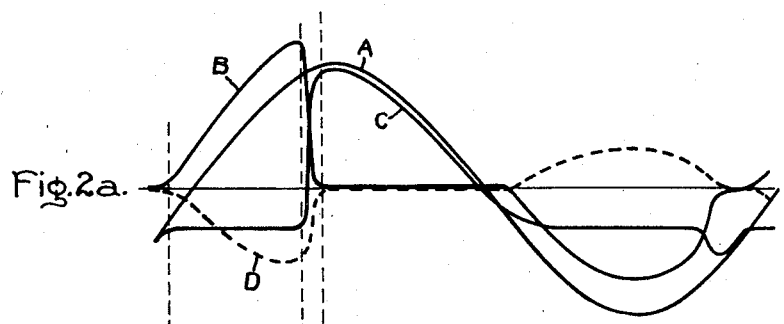
Figure 2B:
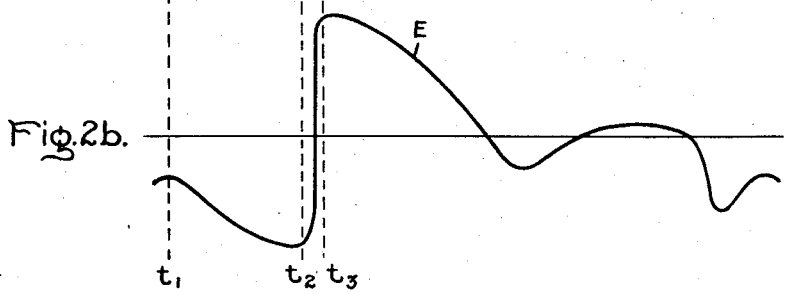

The features and advantages of my invention will be better understood by a brief consideration of the operation of the illustrated embodiment thereof with particular reference to Figs. 2a and 2b. In Fig. 2a, curve A represents the voltage impressed on the series circuit including winding 21 and resistor 22a. Curve B represents the voltage of winding 21 and curve C represents the voltage across the terminals of resistor 22a. From the series circuit relation, it is apparent that curve B plus curve C is at any instant equal to curve A. Curve D represents the terminal voltage of winding 27. This voltage has the same shape as the voltage of winding 21 illustrated by curve B but is illustrated as having the opposite polarity to illustrate the polarity of the voltage impressed on the control member by this winding. The voltage impressed on the control member or grid 20 is the sum of the voltages of resistor 22a and winding 27 or the sum of the voltages of curves C and D. This voltage is shown by curve E in Fig. 2b. Between the times designated T1 and T2 in Figs. 2a and 2b, the magnetic circuit 22 is not saturated and most of the voltage appears across the terminals of winding 21. As illustrated, the voltage across resistor 22a is slightly negative so that the voltage B is slightly greater than the impressed alternating-current voltage A. During this interval, the resultant voltage E impressed on the control member 20 has a considerable negative value being equal to the sum of curves C and D. At T2, the core 22 starts to saturate and, at a short time later at T3, saturation of the core 22 is complete. As a result, the voltage B appearing across the terminals of the winding 21 decreases substantially to zero and the entire voltage of the supply appears across resistor 22a as illustrated by the curve C. Inasmuch as the voltage across winding 27 also reduces substantially to zero during this interval, the voltage impressed on the control member has as high a positive value as if the winding 27 were not present. In this way, the winding 27 provides a substantial negative voltage during the interval just preceding conduction of the electric valve and, at the same time, subtracts nothing from the positive magnitude of the voltage at the time that the electric valve is to be rendered conductive.

While I have shown and described a particular embodiment of my invention, it will be obvious to those skilled in the art that changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. A control circuit for impressing on an output circuit a periodic voltage having a substantial negative portion and a steep wave front in the region where the voltage passes from a negative to a positive value comprising a source of alternating voltage, a resistor, a saturable inductive device including a pair of inductively related windings, means connecting one of said windings and said resistor in series and for energization from said alternating-current source, and means connecting said resistor and said other winding in series and to said output circuit to impress the sum of the voltages of said resistor and said other winding on said output circuit.

2. A control circuit for impressing on an output circuit a periodic voltage having a substantial negative portion and a steep wave front in the region where the voltage passes from a negative to a positive value comprising a source of alternating voltage, an impedance element, a saturable inductive device including a winding, means connecting said winding and said impedance in series and for energization from said alternating-current source, said device being saturable at a predetermined instant in the alternating-current voltage wave of said source to increase the magnitude of the voltage across said impedance element suddenly at said instant, means for impressing the voltage of said impedance on said output circuit, and electric current means having a voltage of the same periodicity as the voltage of said winding for impressing a negative component of voltage on said output circuit which has substantial magnitude during the period just preceding said instant and which reduces substantially to zero at said instant.

3. A control circuit for impressing on an output circuit a periodic voltage having a substantial negative portion and a steep wave front in the region where the voltage passes from a negative to a positive value comprising a source of alternating voltage, an impedance element, a saturable inductive device including a core structure and three inductively related windings, means connecting one of said windings and said impedance in series and for energization from said alternating-current source, said device being saturable at a predetermined instant in the alternating-current voltage wave of said source to increase the magnitude of the voltage across said impedance element abruptly at said instant, means for impressing the voltage of said impedance element on said output circuit, means including a second winding of said device for impressing a negative component of voltage on said output circuit which has substantial magnitude in the period just preceding said instant and which reduces substantially to zero at said instant, and means including the third winding of said device for introducing a magnetomotive force in said core structure to control the instant at which saturation of said core occurs.

4. A control circuit for impressing a periodic voltage on the control member of an electric valve comprising a source of alternating voltage, an impedance element, a saturable inductive device including a core structure and a pair of windings, means connecting one of said windings in series with said impedance element and for energization from said source, and means connecting said second winding and said impedance element in circuit with said control member to impress thereon a periodic voltage having a steep wave front at the instant that said valve is to be rendered conductive and having a substantial negative value during the period immediately preceding said instant.

5. A control circuit for impressing a periodic voltage on the control member of an electric valve comprising a source of alternating voltage, an impedance element, a saturable inductive device including a core structure and a pair of windings, means connecting one of said windings in series with said impedance element and for energization from said source, means including said second winding and said impedance element for impressing on said control member a periodic voltage having a steep wave front at the instant that said valve is to be rendered conductive and having a substantial negative value during the period immediately preceding said instant, and means for controlling the instant in the voltage wave of said source that said core structure saturates.

JEAN A. AUGIER.

REFERENCES CITED

The following references are of record in the file of this patent:

UNITED STATES PATENTS

| Number | Name | Date |
| --- | --- | --- |
| 2,040,768 | Edwards | May 12, 1936 |
| 2,078,152 | Moyer | Apr. 20, 1937 |
| 2,146,091 | Petersen | Feb. 7, 1939 |
| 2,231,670 | Heller | Feb. 11, 1941 |
| 2,292,514 | Garlick | Aug. 11, 1942 |

Certificate of Correction

Patent No. 2,428,604.  October 7, 1947.

JEAN A. AUGIER

It is hereby certified that error appears in the printed specification of the above numbered patent requiring correction as follows: Column 4, line 24, claim 2, for the word "current" read *circuit*; and that the said Letters Patent should be read with this correction therein that the same may conform to the record of the case in the Patent Office.

Signed and sealed this 20th day of April, A. D. 1948.

[SEAL]

THOMAS F. MURPHY,
*Assistant Commissioner of Patents.*